(12) United States Patent
Matsuda et al.

(10) Patent No.: US 11,709,049 B2
(45) Date of Patent: Jul. 25, 2023

(54) BENDING ESTIMATION DEVICE, BENDING ESTIMATION METHOD, AND PROGRAM

(71) Applicant: NIPPON TELEGRAPH AND TELEPHONE CORPORATION, Tokyo (JP)

(72) Inventors: Shigehiro Matsuda, Musashino (JP); Takashi Goto, Musashino (JP); Ryuji Honda, Musashino (JP); Yoshiyuki Kajihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 409 days.

(21) Appl. No.: 16/977,868

(22) PCT Filed: Feb. 28, 2019

(86) PCT No.: PCT/JP2019/007794
§ 371 (c)(1),
(2) Date: Sep. 3, 2020

(87) PCT Pub. No.: WO2019/172066
PCT Pub. Date: Sep. 12, 2019

(65) Prior Publication Data
US 2021/0003390 A1 Jan. 7, 2021

(30) Foreign Application Priority Data
Mar. 5, 2018 (JP) .................................. 2018-038985

(51) Int. Cl.
*G01B 11/24* (2006.01)
*G06T 7/62* (2017.01)
(Continued)

(52) U.S. Cl.
CPC ............ *G01B 11/24* (2013.01); *G06T 7/0002* (2013.01); *G06T 7/62* (2017.01); *G06V 20/653* (2022.01); *G06T 2207/30184* (2013.01)

(58) Field of Classification Search
CPC .. A61K 2800/5922; A61K 8/44; A61K 8/965; A61K 8/9789; A61K 8/9794;
(Continued)

(56) References Cited

U.S. PATENT DOCUMENTS 10,006,821 B1 * 6/2018 Boger ................ G01M 5/0041

FOREIGN PATENT DOCUMENTS

JP       2015224980 A    12/2015
JP       2015232513 A    12/2015

* cited by examiner

*Primary Examiner* — Tri T Ton
(74) *Attorney, Agent, or Firm* — Harness, Dickey & Pierce, P.L.C.

(57) ABSTRACT

Even when a missing portion occurs in a solid data set on a columnar structure, an estimator for a deflection value and an accuracy of the deflection value are correctly estimated according to an extent of the missing portion and the like. A measurement accuracy estimation unit (15) is included that: calculates a deflection of a columnar structure and an extent of a missing portion, from a solid data set on the columnar structure; calculates an accuracy assessment indicator for the deflection that is acquirable when a plurality of missing portion patterns occur on a virtual basis, based on a plurality of solid data sets in each of which the calculated extent of the missing portion is smaller than a preset threshold value, the accuracy assessment indicator being calculated for each missing portion pattern; and calculates an accuracy of the deflection calculated from the solid data set, based on the calculated accuracy assessment indicator for each missing portion pattern, and based on the calculated extent of the missing portion in the solid data set.

8 Claims, 4 Drawing Sheets

(51) Int. Cl.
*G06T 7/00* (2017.01)
*G06V 20/64* (2022.01)

(58) Field of Classification Search
CPC .................. A61Q 19/00; A61Q 19/007; F17C
2270/0105; F17C 2270/0168; F17C
2270/0189; F17C 9/02; F17C 13/025;
F17C 2205/0323; F17C 2227/0309; F17C
2265/066; G01B 11/24; G06T
2207/30184; G06T 7/0002; G06T 7/62;
G06T 2207/10028; G06T 2207/30132;
G06T 2207/30164; G06T 2207/30172;
G06T 7/001; G06V 20/64; G06V 20/653
USPC ............. 356/2–22, 3.01–3.16, 4.01–4.9, 4.1,
356/5.01–5.9, 5.1–5.15, 32–35.5,
356/614–640, 250
See application file for complete search history.

BENDING ESTIMATION DEVICE, BENDING ESTIMATION METHOD, AND PROGRAM

CROSS-REFERENCE TO RELATED APPLICATIONS

This application is a 371 U.S. National Phase of International Application No. PCT/JP2019/007794, filed on Feb. 28, 2019, which claims priority to Japanese Application No. 2018-038985, filed on Mar. 5, 2018. The entire disclosures of the above applications are incorporated herein by reference.

TECHNICAL FIELD

The present invention relates to a deflection estimation device, a deflection estimation method, and a program that are suitable particularly for estimating an amount of deflection of a columnar structure.

BACKGROUND ART

Techniques for estimating a deflection value of a columnar structure with high accuracy are proposed (for example, Patent Literatures 1, 2).

CITATION LIST

Patent Literature

Patent Literature 1: Japanese Patent Laid-Open No. 2015-224980
Patent Literature 2: Japanese Patent Laid-Open No. 2015-232513

SUMMARY OF THE INVENTION

Technical Problem

With the techniques according to Patent Literatures 1, 2, when three-dimensional points data on a solid structure (hereinafter, referred to as "solid data set") is acquired by using measurement equipment such as an MMS (Mobile Mapping System), it is enabled to calculate a deflection value even if a missing portion partially occurs in the generated solid data set due to presence of a shielding object or the like against the structure, by estimating solid data corresponding to the missing portion based on the acquired points.

However, when a missing portion occurs in a solid data set, a deflection value that greatly deviates from a deflection value to be originally calculated based on the solid data set with no missing portion may be calculated, depending on a position and a size of the missing portion.

The present invention is made in light of the above-described circumstances, and an object thereof is to provide a deflection estimation device, a deflection estimation method, and a program that, even when a missing portion occurs in a solid data set on a columnar structure, make it possible to correctly estimate an estimator for a deflection value and an accuracy of the deflection value, according to an extent of the missing portion and the like.

Means for Solving the Problem

An aspect of the present invention includes: a first computation unit that calculates a deflection of a columnar structure and an extent of a missing portion, from a solid data set on the columnar structure; a second computation unit that calculates an accuracy assessment indicator for the deflection that is acquirable when a plurality of missing portion patterns occur on a virtual basis, based on a plurality of the solid data sets in each of which the extent of the missing portion calculated by the first computation unit is smaller than a preset threshold value, the accuracy assessment indicator being calculated for each of the missing portion patterns; and a third computation unit that calculates an accuracy of the deflection calculated from the solid data set, based on the accuracy assessment indicator for each missing portion pattern calculated by the second computation unit, and based on the extent of the missing portion in the solid data set calculated by the first computation unit.

Effects of the Invention

According to the present invention, even when a missing portion occurs in a solid data set on a columnar structure, it is possible to correctly estimate an estimator for a deflection value and an accuracy of the deflection value, according to an extent of the missing portion and the like.

DESCRIPTION OF EMBODIMENTS

Hereinafter, a detailed description will be given of an embodiment in a case of application to a management server system for a utility pole facility that is a columnar structure, with reference to drawings.

Figure 1:
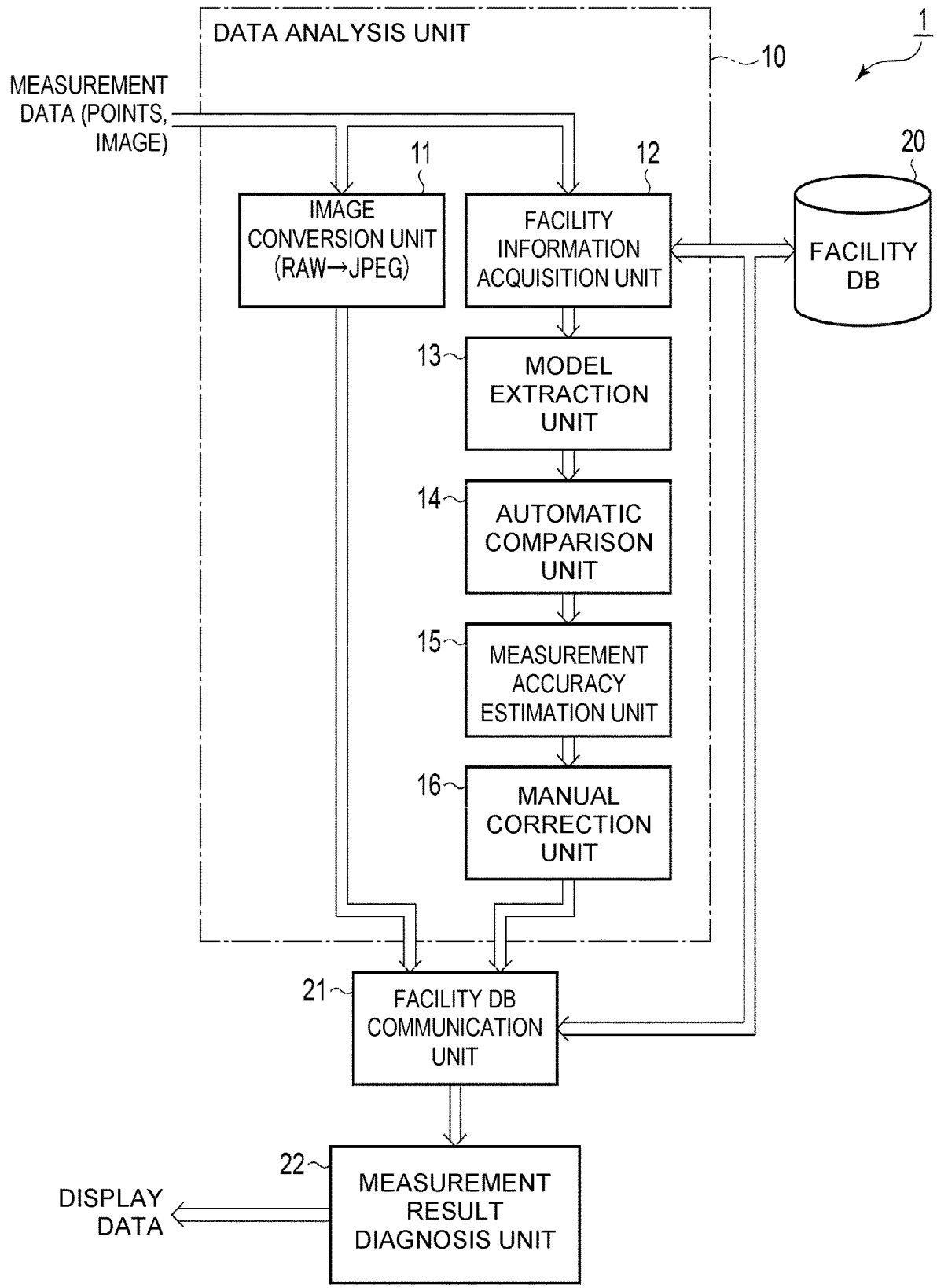
FIG. 1 is a block diagram showing a functional circuit configuration in a management server system according to an embodiment of the present invention.

FIG. 1 is a block diagram showing a functional circuit configuration in the management server system 1. In the drawing, measurement data that includes three-dimensional points data including data on a utility pole that is a columnar structure, unprocessed image data, and the like is inputted to a data analysis unit 10 by using measurement equipment such as an MMS, directly from any recording medium or via a network (not shown) including the Internet.

At the data analysis unit 10, the image data in the measurement data is transmitted to an image conversion unit 11, and the points data in the measurement data is transmitted to a facility information acquisition unit 12.

The image conversion unit 11 converts RAW data that is the transmitted unprocessed image data into JPEG (Joint Photographic Experts Group) data that is lossy compressed image data, and transmits the JPEG data to a facility database (DB) communication unit 21, which will be described later, outside the data analysis unit 10.

The facility information acquisition unit 12, based on location data associated with the points data in the transmitted measurement data, reads facility information on facilities in and around a location area of interest from a facility database (DB) 20 that stores information on all facilities in a centralized manner, and outputs the read facility information together with the measurement data to a model extraction unit 13.

The model extraction unit 13, based on the facility information read via the facility information acquisition unit 12, extracts columnar structures seeming to be utility poles, cables including guy wires, and the like from the points data to be included in a solid data set and, with respect to each columnar structure, further creates central axis data by connecting center points of horizontal cross sections, and outputs results of the processing to an automatic comparison unit 14.

The automatic comparison unit 14 sequentially compares each columnar structure extracted by the model extraction unit 13 against identification information on each utility pole based on location information and a structural characteristic by referring to the facility information read from the facility database 20, and outputs results of the comparison to a measurement accuracy estimation unit 15.

The measurement accuracy estimation unit 15 performs calculation of a deflection value, estimation of a measurement accuracy, and the like for each columnar structure subjected to the comparison with the identification information on each utility pole, and outputs results of the processing to a manual correction unit 16.

The manual correction unit 16 receives manual operations for correction as described below through data transmission and reception to/from a terminal device (not shown) connected to the management server system 1, and makes outputs including results of the correction to the facility database communication unit 21 outside the data analysis unit 10. The manual operations include manual comparison of a columnar structure failing to be subjected to the automatic comparison by the automatic comparison unit 14 against the identification information on each utility pole, correction of the identification information on each utility pole used in the automatic comparison, and the like.

The facility database communication unit 21 stores the image data converted into the JPEG data transmitted from the image conversion unit 11 and the measurement data including the results of the comparison with the utility poles transmitted from the manual correction unit 16 in the facility database 20, and, when required, reads the measurement data stored in the facility database 20 and outputs the measurement data to a measurement result diagnosis unit 22.

The measurement result diagnosis unit 22, while outputting various data to a terminal device (not shown) on which an operator operates necessary display data as appropriate, receives an input made by the operator from the terminal device and performs various diagnosis assist processing on a result of measurement of a columnar structure, specifically such as display of a progress status, superimposed display of the image data on the points data, display of an omnidirectional image, matching against a GIS (Geographic Information System), display of a list of diagnosis results, and manual extraction of a model.

Next, operation in the embodiment will be described.

Figure 2:
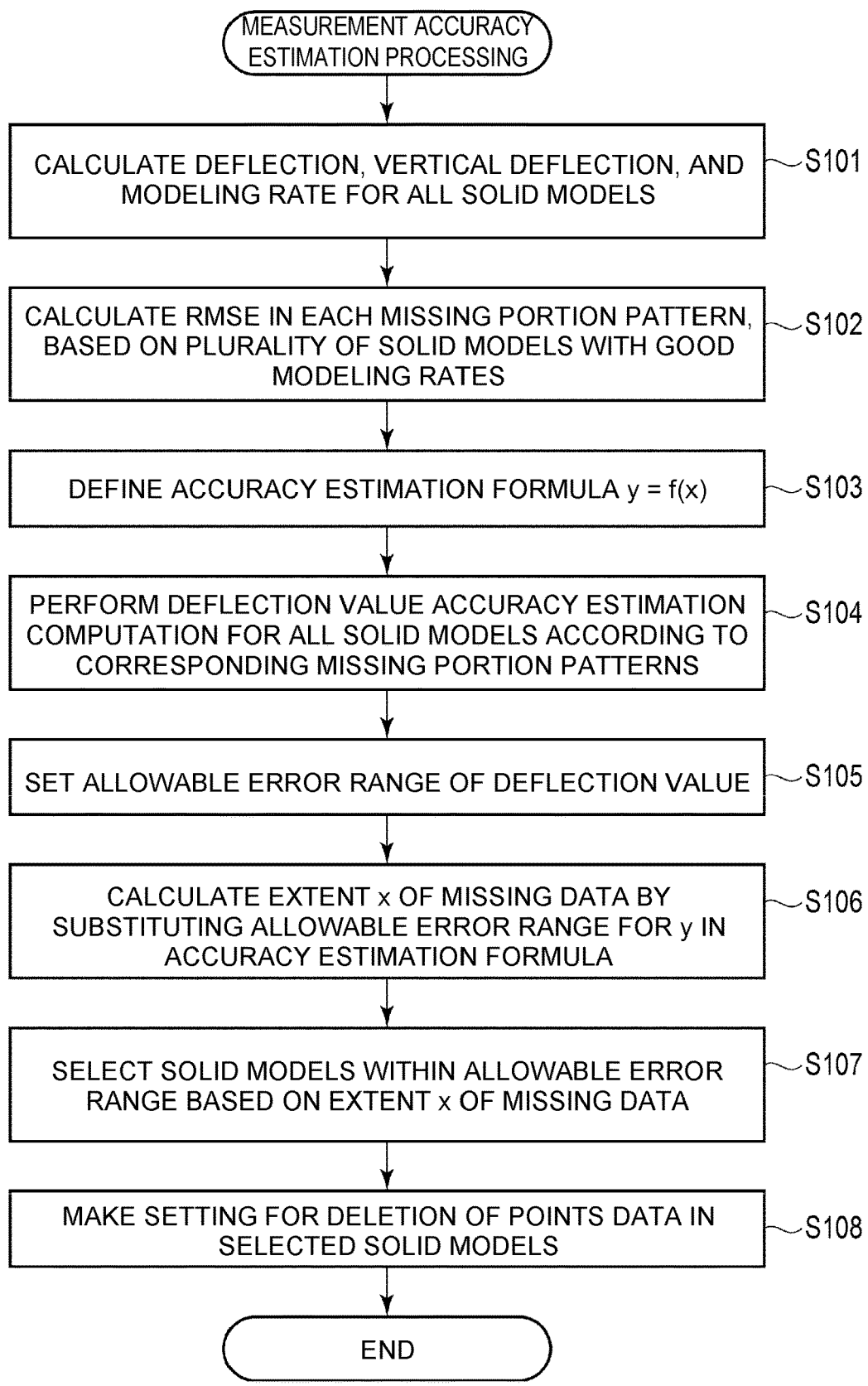
FIG. 2 is a flowchart showing contents of processing mainly performed by a measurement accuracy estimation unit, according to the embodiment.

FIG. 2 is a flowchart showing contents of processing mainly performed by the measurement accuracy estimation unit 15. In the drawing, first, the measurement accuracy estimation unit 15 calculates a deflection value, a vertical deflection value, and a modeling rate, which indicates an extent of a missing portion in a solid data set, for each of all solid data sets on columnar structures acquired from the automatic comparison unit 14 (step S101).

Figure 3:
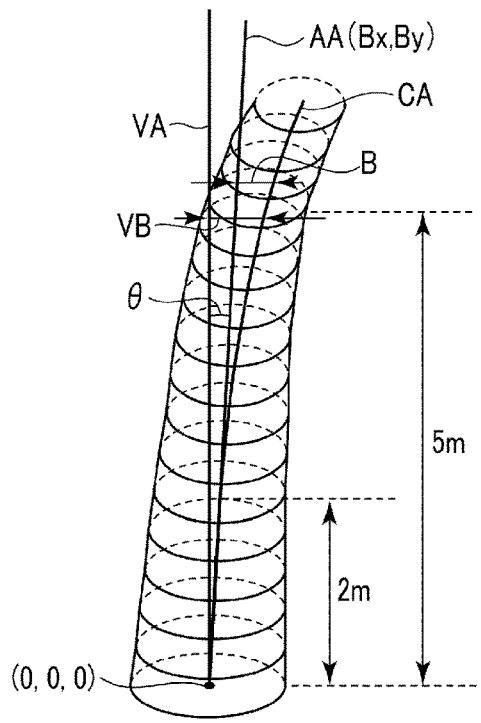
FIG. 3 is a diagram for explaining a definition of each element of a solid data set on a columnar structure, according to the embodiment.

FIG. 3 is a diagram for explaining a definition of each element of a solid data set on a utility pole that is a columnar (cylindrical) structure. In the drawing, it is assumed that a position of a center point of the columnar structure at a lowest point that is a ground surface serves as a point of origin, three-dimensional (xyz) coordinates of the point of origin are (0, 0, 0), and points data is obtained, for example, at 4 [cm] intervals in a vertical direction.

A vertical axis VA in the drawing is a straight-line axis extended upward from the point of origin in the vertical direction. A central axis CA is a curve obtained by sequentially connecting a center point of each circular cross section, and can be obtained in such a manner that each processing for extraction and correction is performed by the model extraction unit 13 as described above.

A reference axis AA is a virtual straight line connecting the position of the point of origin and a position at a certain height, for example, a height of 2 [m] on the central axis. As shown in the drawing, an angle between the vertical axis VA and the reference axis AA is defined as an inclination $\theta$.

Moreover, a distance between the central axis CA and the reference axis AA along a horizontal plane at a certain height greater than the above-mentioned 2 [m], for example, at a height of 5 [m], which serves as a reference height position for a representative deflection of the utility pole, is defined as a deflection B, and a distance between the central axis CA and the vertical axis VA along a horizontal plane at the height is defined as a vertical deflection VB.

For the modeling rate, which indicates an extent of a missing portion in a solid data set, different definitions are used between when a height up to an upper end portion is not less than a predetermined value, for example, 10 [m], and when the height is less than 10 [m].

Here, a reason for separating processing by using 10 [m] as a threshold value will be explained. In MMSs, since accuracy of acquired points data decreases as a distance increases due to measurement characteristics, it is difficult to create solid data particularly on an upper end of a columnar structure. Accordingly, if an extent of a missing portion in a columnar structure that is 10 [m] or higher is defined similarly to a columnar structure that is less than 10 [m], the columnar structure that is 10 [m] or higher will have a lower extent of a missing portion, and hence different definitions are used so that equivalent assessments are made.

When the height for a solid data set is 10 [m] or greater, a modeling rate indicating an extent of a missing portion in the solid data set is defined as a following formula:

$$((\text{Number of measurement circles(number of center points)})/(\text{Height of column} \times (5/6) \times 0.85 \div 4 \text{ [cm]})) \times 100 [\%] \qquad (1).$$

On the other hand, when the height for a solid data set is less than 10 [m], a modeling rate indicating an extent of a missing portion in the solid data set is defined as a following formula:

$$((\text{Number of measurement circles(number of center points)})/(\text{Height of column} \times (5/6) \div [\text{cm}])) \times 100 [\%] \qquad (2).$$

It is assumed that a minimum interval (in a height, z direction) between center points of circles for a solid data set is 4 [cm] in a current case as defined in each of the formulas, and that when a result of calculation based on any one of the modeling rate initializations exceeds 100[%], the result is processed to be rounded down to 100[%], which is then outputted.

After the deflection values, the vertical deflection values, and the modeling rates are calculated for all of the solid data sets, the measurement accuracy estimation unit 15 next selects, among the solid data sets, a plurality of solid data sets with smaller extents of missing portions, for example, solid data sets with modeling rates of 99[%] or higher, generates solid data sets having a plurality of missing portion patterns on a virtual basis, and thereafter calculates RMSEs (Root Mean Squared Errors) with respect to deflection values before occurrence of the missing portions according to the modeling rates (step S102).

Figure 4:
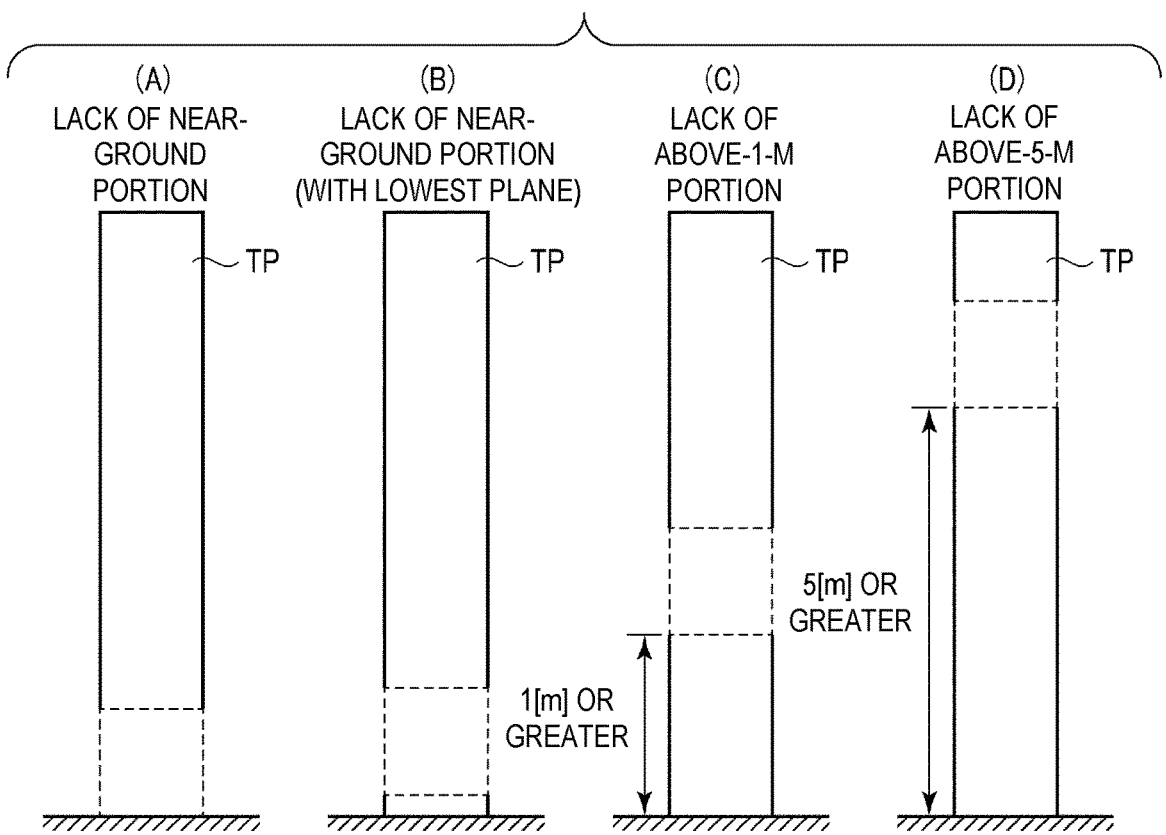
FIG. 4 illustrates four missing portion patterns in a columnar structure, according to the embodiment.

FIG. 4 shows an example in which missing portions in a columnar structure are classified into four patterns. FIG. 4(A) is a pattern A, "lack of near-ground portion", in which a missing portion occurs at a lower position including a ground position in a solid data set TP on a columnar structure; FIG. 4(B) is a pattern B, "lack of near-ground portion (with lowest plane)", in which no missing portion occurs at the ground position in the solid data set TP, but a missing portion occurs at a lower position; FIG. 4(C) is a pattern C, "lack of above-1-m portion", in which a missing portion occurs above a first predetermined height, for example, a height of 1 [m] in the solid data set TP; and FIG. 4(D) is a pattern D, "lack of above-5-m portion", in which a missing portion occurs above a second predetermined height that is greater than the first predetermined height, for example, a height of 5 [m] in the solid data set TP.

Based on the calculated RMSEs with respect to the deflections before occurrence of the missing portions according to the modeling rates in each of the plurality of missing portion patterns, a set A of as many (x, y) pairs as the number of missing portions subjected to the RMSE calculation is generated for each missing portion pattern, assuming that x is an extent of a missing portion and y is an RMSE.

Next, straight lines or curves that most fit the generated sets A are calculated respectively. For a calculation method, it is only necessary that a function that fits each set A can be defined, and the function is defined as a deflection value accuracy estimation formula, "y=f(x)" (step S103).

Figure 5:
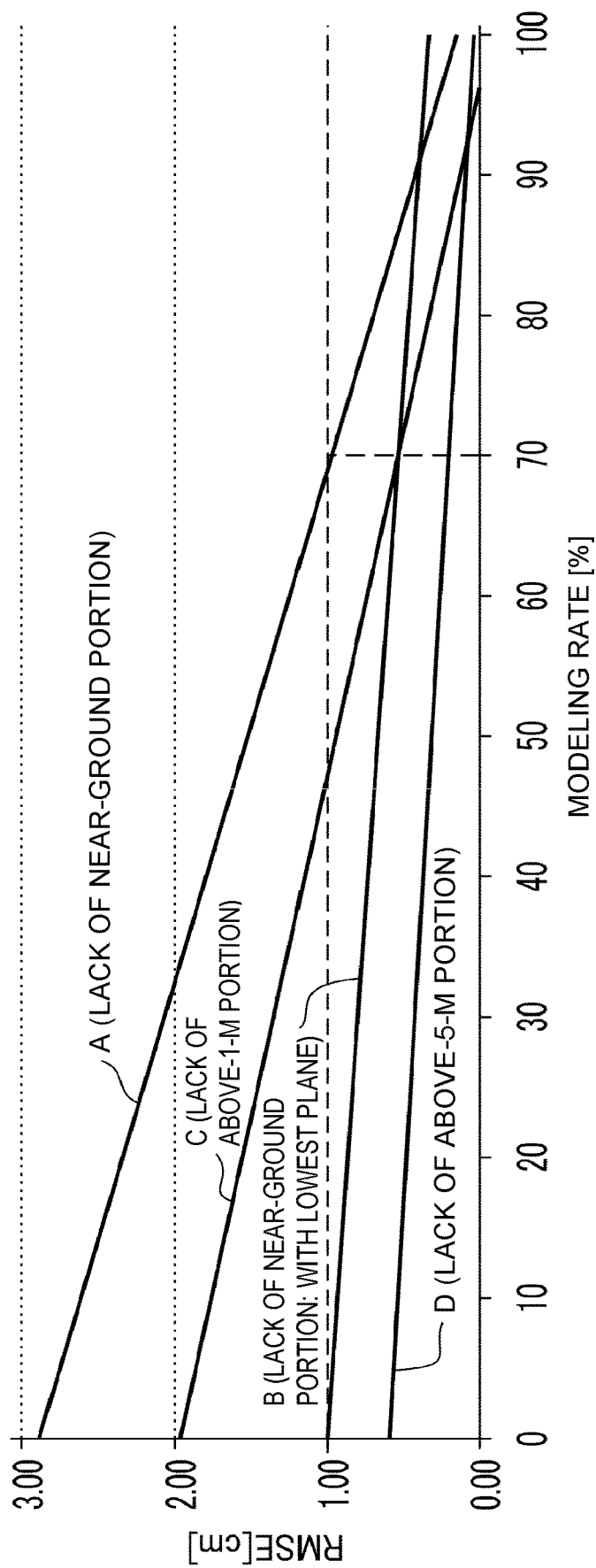
FIG. 5 shows a relationship between modeling rate and RMSE for each missing portion pattern, according to the embodiment.

FIG. 5 illustrates relationships between modeling rate and RMSE for the missing portion patterns A to D, respectively, as results of defining the function "y=f(x)" in a form of a linear formula. Since the RMSE is an indicator of poorness of projection accuracy of a model, an RMSE that is closer to "0 (zero)" indicates a higher estimated accuracy.

By using the thus obtained accuracy estimation formula for each missing portion pattern, deflection value accuracy estimation computation is performed for all of the solid models according to the corresponding missing portion patterns (step S104).

In the example shown in FIG. 5, with respect to all of the solid data sets, RMSEs can be confined within a range of "(true value−1 [cm])×y" to "(true value+1 [cm])×y" (under a dashed line in the drawing) with a probability of approximately 68[N], and can be confined within a range of "(true value−2 [cm])×y" to "(true value+2 [cm])×y" with a probability of approximately 95[%].

As described above, after the accuracy estimation computation is performed for all of the solid data sets, the measurement accuracy estimation unit 15 receives setting of an allowable error range of a deflection value for the estimated accuracy (step S105). For the allowable range, a certain value, for example, "±1 [cm]" may be preset, or manually set by an operator each time solid data sets are inputted into the management server system 1.

The measurement accuracy estimation unit 15 calculates a modeling rate x that is an extent of a missing portion in a solid data set, by substituting the set allowable error range for y in the deflection value accuracy estimation formula "y=f(x)" defined in step S103 (step S106).

Note that since the accuracy estimation formula "y=f(x)" varies according to a missing portion pattern as described above, for example, when missing portions are classified into the four missing portion patterns A to D described in FIGS. 4 and 5, a modeling rate x that is an extent of a missing portion in a solid data set is calculated according to each of the missing portion patterns A to D.

Next, based on the modeling rate x calculated according to each missing portion pattern, the measurement accuracy estimation unit 15 selects solid data sets within the allowable error range in the missing portion pattern of interest (step S107).

Assuming that a sufficient estimated accuracy is obtained with respect to each of the selected solid data sets, setting is made such that points data corresponding to a portion that least affects calculation of a deflection is deleted to an extent of an allowable error (step S108), and here the processing by the measurement accuracy estimation unit 15 is terminated.

For the setting for deletion of points data in a solid data set, processing for the deletion is not immediately performed by the measurement accuracy estimation unit 15, but may be performed after processing for the operator manual correction by the manual correction unit 16 at a subsequent stage is completed.

All of the solid data sets including the solid data sets from which points data is deleted are stored, along with the image data converted into JPEG data files by the image conversion unit 11, in the facility database 20 by the facility database communication unit 21.

As described above, according to the embodiment, even when a missing portion occurs in a solid data set on a columnar structure, it is possible to correctly estimate an estimator for a deflection value and an accuracy of the deflection value, according to an extent of the missing portion and the like.

In the embodiment, missing portions in solid data sets are classified into a plurality of missing portion patterns depending on a distance from the ground surface and a range of each missing portion as described in FIGS. 4 and 5. Accordingly, it is easy to quantify handlings related to extents of missing portions, so that processing loads can be reduced.

Additionally, in the embodiment, for solid data sets on columnar structures that are utility poles, different formulas for computing a modeling rate are calculated between when a columnar structure is not less than a certain height, for example, 10 [m] and when a columnar structure is less than 10 [m]. Accordingly, a value range of extents of missing portions to be handled is prevented from expanding without limits according to a target scope of measurement, so that the processing loads can be further reduced.

Further, in the embodiment, setting is made such that points data is deleted from a solid data set for which it is determined that an extent of a missing portion is small because with respect to such a solid data set, a central axis of a columnar structure is obtained with relatively high accuracy. Accordingly, a data volume stored in the facility database 20 can be reduced as necessary.

Note that in the embodiment, the description is given in which the accuracy estimation formula and the like are calculated by using, among solid data sets acquired through measurement, solid models considered to have a small extent of a missing portion and a high accuracy in deflection estimation.

However, the present invention is not limited to such a case, and it may be determined whether or not a solid model acquired through current measurement is used, by using a result of an accuracy estimation formula considered to have the largest effect among accuracy estimation formulas created from measurement data acquired in the past.

For example, as shown at the missing portion pattern A "lack of near-ground portion" in the characteristic graph shown in FIG. 5, it can be learnt that a missing portion in a "near-ground portion" most affects deflection. Accordingly, for example, in a case of an allowable error of ±1 [cm], solid models with modeling rates of 70[%] or higher are selected and adopted by using an accuracy estimation formula for "lack of near-ground portions" acquired in the past, whereby most utility pole models can be confined within the set allowable error range.

Note that the invention of the present application is not limited to the above-described embodiment, and various changes can be made without departing from the scope of the invention in the implementation phase. Each embodiment can be combined with others as appropriate to an extent possible, and in such a case, combined effects can be achieved. Moreover, the embodiment includes inventions at various stages, and various inventions can be extracted depending on appropriate combinations of the plurality of disclosed components.

REFERENCE SIGNS LIST

1 Management server system
10 Data analysis unit
11 Image conversion unit
12 Facility information acquisition unit
13 Model extraction unit
14 Automatic comparison unit
15 Measurement accuracy estimation unit
16 Manual correction unit
20 Facility database (DB)
21 Facility database (DB) communication unit
22 Measurement result diagnosis unit

The invention claimed is:

1. A deflection estimation device comprising:
a processor; and
a non-transitory storage medium having computer program instructions stored therein, when executed by the processor, perform to:
calculate a deflection of a columnar structure and an extent of a missing portion, from a solid data set on the columnar structure;
calculates an accuracy assessment indicator for the deflection that is acquirable when a plurality of missing portion patterns occur on a virtual basis, based on a plurality of the solid data sets in each of which the extent of the missing portion is smaller than a preset threshold value, the accuracy assessment indicator being calculated for each of the missing portion patterns; and
calculates an accuracy of the deflection calculated from the solid data set, based on the accuracy assessment indicator for each missing portion pattern, and based on the extent of the missing portion in the solid data set.

2. The deflection estimation device according to claim 1, wherein the columnar structure protrudes upward from a ground surface, and the plurality of missing portion patterns are classified into a plurality of missing portion patterns according to a distance from the ground surface and a range of the missing portion.

3. The deflection estimation device according to claim 2, wherein for the extent of the missing portion, a calculation formula is variably set according to a range in height of an upper-end position of the columnar structure from the ground surface.

4. The deflection estimation device according to claim 1 wherein the non-transitory storage medium stores the deflection and the extent of the missing portion calculated from the solid data set, the accuracy of the deflection, and the points data in the solid data set in association with each other; and
wherein the computer program instructions further perform to calculate the deflection and the extent of the missing portion, from the solid data set on the columnar structure including three-dimensional points data and cancel storage of at least part of the points data in the solid data set in the storage unit, depending on the accuracy of the deflection.

5. A deflection estimation method comprising:
a first computation step of calculating a deflection of a columnar structure and an extent of a missing portion, from a solid data set on the columnar structure;
a second computation step of calculating an accuracy assessment indicator for the deflection that is acquirable when a plurality of missing portion patterns occur on a virtual basis, based on a plurality of the solid data sets in each of which the extent of the missing portion calculated in the first computation step is smaller than a preset threshold value, the accuracy assessment indicator being calculated for each of the missing portion patterns; and
a third computation step of calculating an accuracy of the deflection calculated from the solid data set, based on the accuracy assessment indicator for each missing portion pattern calculated in the second computation step, and based on the extent of the missing portion in the solid data set calculated in the first computation step.

6. The deflection estimation method according to claim 5, wherein the columnar structure protrudes upward from a ground surface, and the plurality of missing portion patterns are classified into a plurality of missing portion patterns according to a distance from the ground surface and a range of the missing portion.

7. The deflection estimation method according to claim 6, wherein for the extent of the missing portion, a calculation formula is variably set according to a range in height of an upper-end position of the columnar structure from the ground surface.

8. The deflection estimation method according to claim 6 further comprises:
storing the deflection and the extent of the missing portion calculated from the solid data set, the accuracy of the deflection, and the points data in the solid data set in association with each other; and
calculating the deflection and the extent of the missing portion, from the solid data set on the columnar structure including three-dimensional points data and cancel storage of at least part of the points data in the solid data set in the storage unit, depending on the accuracy of the deflection.

* * * * *